Feb. 20, 1968     J. A. BURNS     3,369,768
ROTARY LOCKING SEAT-BELT RETRACTOR
Filed Nov. 5, 1965     3 Sheets-Sheet 1
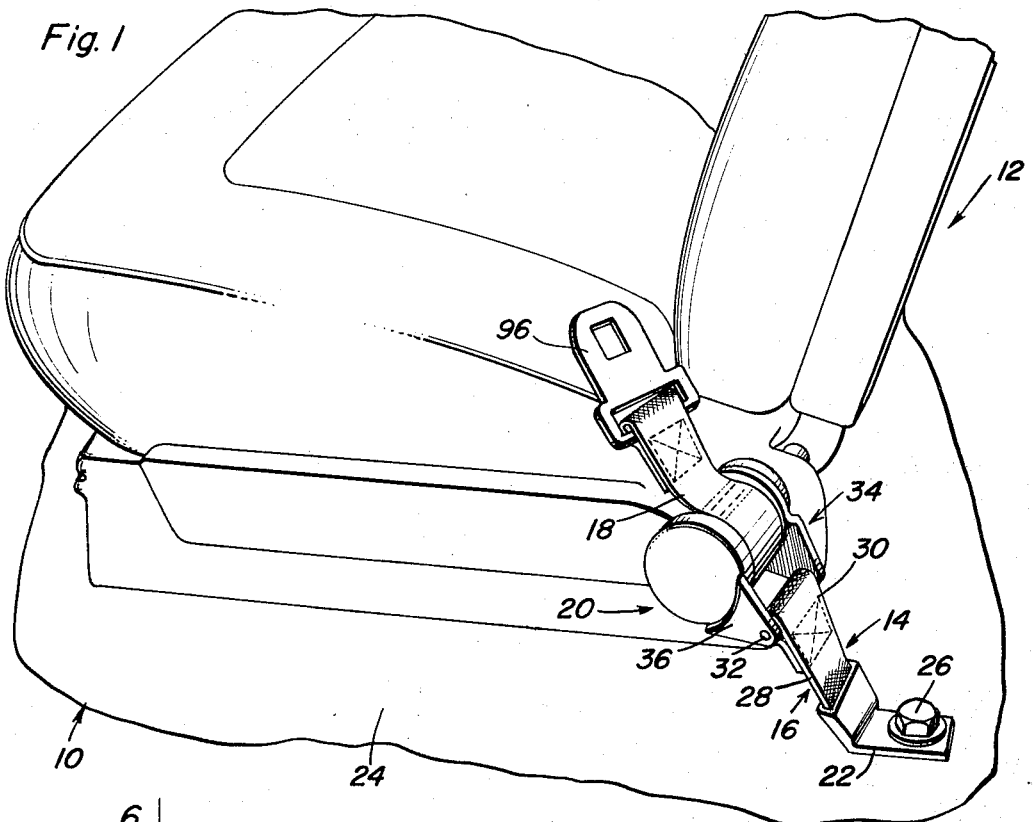
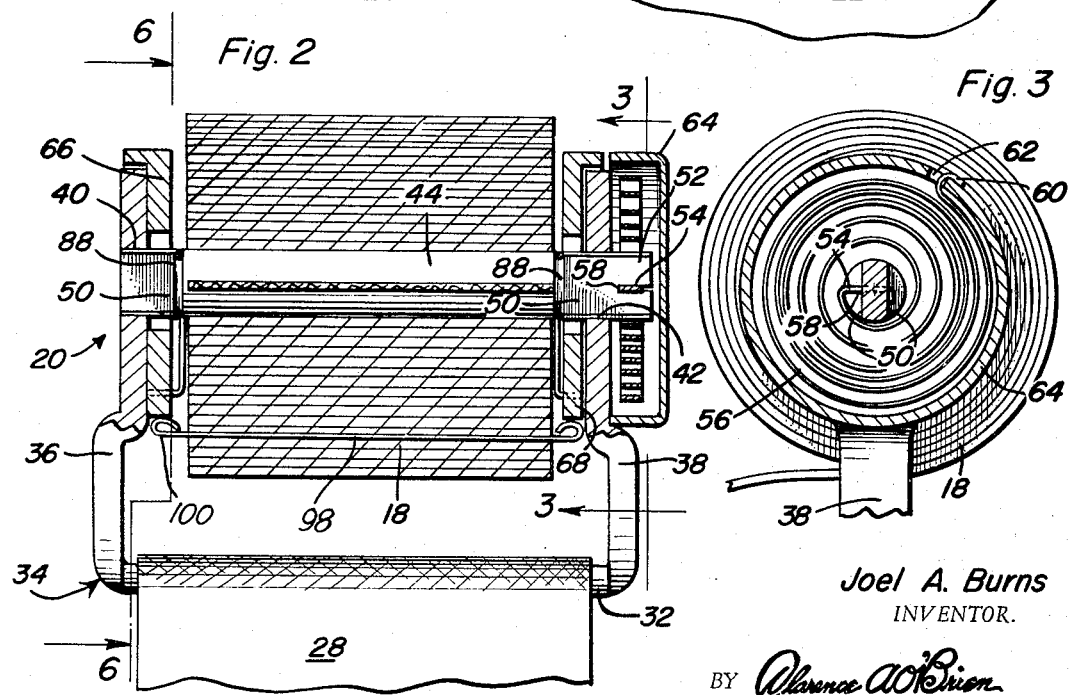
Joel A. Burns
INVENTOR.
BY Clarence A. O'Brien
and Harvey B. Jacobson
Attorneys Joel A. Burns
INVENTOR.

Feb. 20, 1968

J. A. BURNS 3,369,768

ROTARY LOCKING SEAT BELT RETRACTOR

Filed Nov. 5, 1965

Joel A. Burns
INVENTOR.

BY Clarence A. O'Brien
and Harvey B. Jacobson
Attorneys 3,369,768
ROTARY LOCKING SEAT BELT RETRACTOR
Joel A. Burns, 3717 Del Mar Drive NE.,
Albuquerque, N. Mex. 87111
Filed Nov. 5, 1965, Ser. No. 506,560
12 Claims. (Cl. 242—107.4)

ABSTRACT OF THE DISCLOSURE

A journaled winding member having one end of a seat belt secured thereto for winding on and unwinding from the winding member with means being operatively associated with the winding member for automatically locking the latter against rotation in a direction to unwind the seat belt therefrom upon rotation of the winding member past a position with a predetermined minimum amount of the seat belt wound thereon at a speed lower than a predetermined minimum speed.

---

This invention relates to a novel and useful seat belt retracting and locking mechanism and more specifically to a retracting and locking mechanism for a spring urged seat belt winding member and operative in a manner to enable free winding of the associated seat belt section at all times by spring action and enabling a fully wound seat belt section to be freely unwound until a predetermined minimum amount of seat belt section has been unwound. The seat belt retracting and locking mechanism of the instant invention is also operative, after the predetermined minimum amount of free end of the associated seat belt is unwound therefrom, to prevent further unwinding of the associated seat belt section as soon as the unwinding of the seat belt section is slowed or stopped. In this manner, the associated seat belt section may be rapidly or slowly unwound from a fully retracted position to the above-mentioned minimum extended position and then freely rapidly unwound past the minimum extended position to whatever extended position is desired before the locking mechanism prevents further unwinding of the associated seat belt as soon as the unwinding action of the associated belt section is slowed or stopped.

The automatic locking mechanism of the instant invention is constructed in a manner whereby it is substantially foolproof and will prevent further extension of the associated seat belt section from any given extended position past a minimum extended position until such time as the seat belt section is retracted at least to that minimum extended position and then rapidly extended past that minimum extended position.

The main object of this invention is to provide a seat belt retractor and automatic locking means therefor which may be readily adapted for use in substantially all existing passenger vehicles and which will lend itself to being mounted in these various passenger vehicles in many of the various conventional ways presently used.

Another object of this invention is to provide a seat belt retractor including a ratchet-type one-way clutch for preventing protraction of the associated seat belt section after a predetermined minimum amount of the seat belt section is protracted and yet which will enable silent retraction of the associated seat belt section from a fully protracted position.

A final object of this invention to be specifically enumerated herein is to provide a seat belt retractor with automatic locking means and constructed in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a fragmentary perspective view of a passenger seat construction of a conventional form of motor vehicle shown with a seat belt assembly utilizing the seat belt retractor and automatic locking means of the instant invention operatively associated with the passenger seat construction;

FIGURE 2 is an enlarged fragmentary elevational view of the seat belt retractor of the instant invention with parts thereof being broken away and shown in vertical section;

FIGURE 3 is a fragmentary vertical sectional view taken substantially upon the plane indicated by the section line 3—3 of FIGURE 2;

Figure 4:
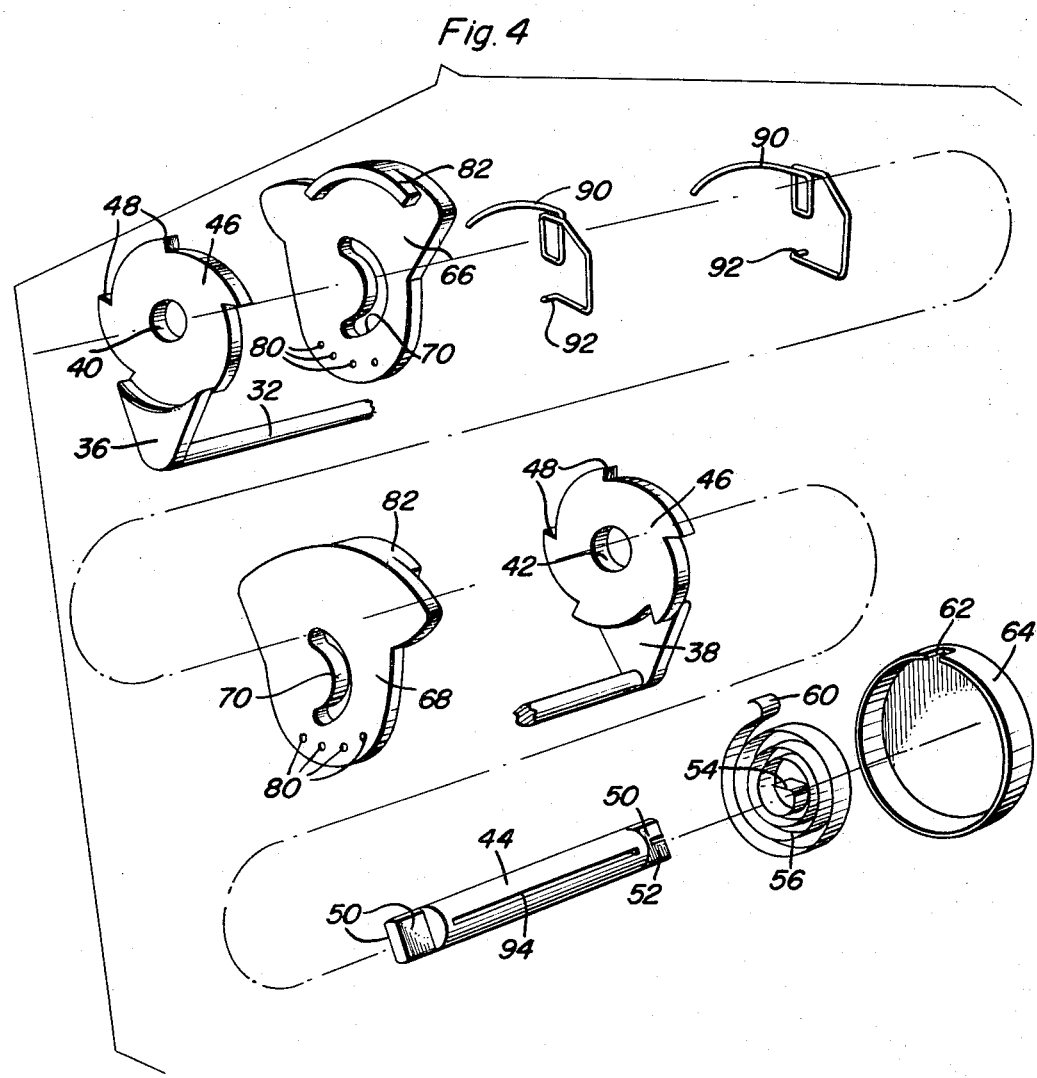
FIGURE 4 is an exploded perspective view of the seat belt retractor.
Figure 5:
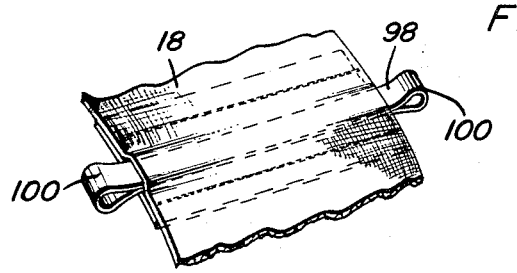
FIGURE 5 is a fragmentary perspective view of the retractable seat belt section associated with the seat belt retractor of the instant invention and illustrating the manner in which one portion of the seat belt retractor is carried by the seat belt section a spaced distance from the end thereof anchored to the seat belt retractor.
Figure 6:
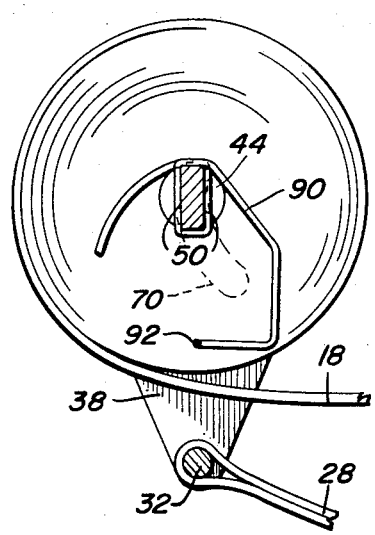
FIGURE 6 is a vertical sectional view taken substantially upon the plane indicated by the section line 6—6 of FIGURE 2.
Figure 7:
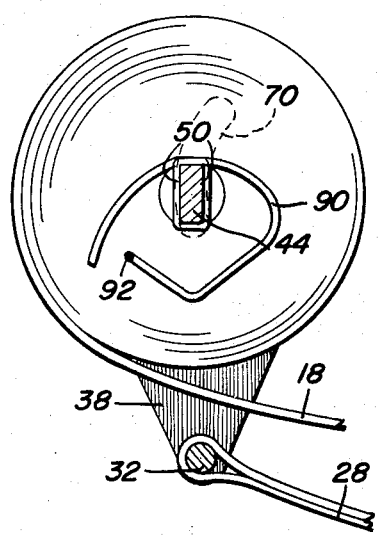
Figure 8:
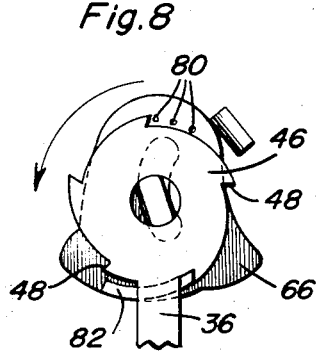
Figure 9:
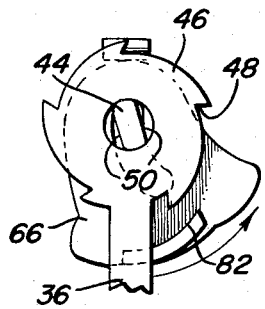
Figure 10:
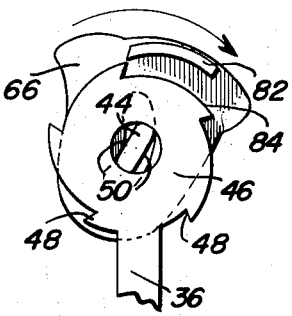

FIGURE 7 is a vertical sectional view similar to that of FIGURE 6 but illustrating the ratchet dog assembly as well as its controlling spring in alternate positions; and FIGURES 8–10 are schematic views of one of the ratchet wheels and its associated ratchet dog assembly in their relative positions when the associated seat belt is locked against retraction, when the associated seat belt is being rapidly unwound, and when the associated seat belt is being rewound.

Referring now more specifically to the drawings, the numeral 10 generally designates a conventional form of passenger vehicle having a passenger seat construction generally referred to by the reference numeral 12 disposed therein and alongside of which a seat belt assembly generally referred to by the reference numeral 14 is disposed. The seat belt assembly 14 includes an anchor assembly generally referred to by the reference numeral 16 and an extendible seat belt section 18 at least partially wound upon a seat belt retractor assembly generally referred to by the reference numeral 20 and suitably anchored to the anchor assembly 16.

The anchor assembly 16 includes an anchor bracket 22 suitably secured to the floor 24 of the vehicle 10 by means of a suitable fastener 26 and a short length of flexible belting 28 having one free end portion 30 secured to a cross member 32 of the main frame 34 comprising a part of the seat belt retractor assembly 20.

The main frame 34 of the seat belt retractor assembly 20 includes a pair of generally parallel opposite side portions 36 and 38 which are interconnected by means of the cross member 32 and which are suitably apertured as at 40 and 42, respectively, to rotatably journal an elongated shaft-like winding member 44.

The portions of the side portions 36 and 38 having the apertures 40 and 42 formed therein are laterally offset and define ratchet wheel portions 46 including ratchet teeth 48. The end portions of the shaft or winding member 44 rotatably journaled in the apertures or bores 40 and 42 include diametrically opposite flattened portions 50 and one end of the shaft 44 includes a diametrically slotted extension 52 with which an angulated end portion 54 of the innermost convolution of a coil spring 56 is anchored as at 58, the outermost convolution of the coil spring 56 including an outturned end portion 60 anchored in a suitable slot 62 formed in a cup-shaped cover 64 removably secured to the side portion 38 in any convenient manner (not shown).

A pair of generally panel-like ratchet dog plates or assemblies 66 and 68 are mounted on the end portions of the shaft 44 disposed inwardly of the side portions 36 and 38 and include arcuate slots 70 which slidably receive the flattened end portions of the shaft 44. Each of the assemblies 66 and 68 is provided with a plurality of small diameter bores 80 on one end adjacent the corresponding end of the associated slot 70 and with a laterally projecting dog element 82 on the other end. Each of the dog elements 82 is arcuate in configuration and conforms in shape generally to the contour of the outer surfaces 84 of the associated teeth 48. The dog elements 82 are shiftable, with the corresponding assemblies 66 and 68, from positions seated in engagement with one pair of corresponding teeth 48 as illustrated in FIGURE 8 of the drawings to positions shifted outwardly of the radial outermost portions of the teeth 48 such as illustrated in FIGURE 9. The assemblies 66 and 68 are eccentrically weighted so that they are shifted to the positions illustrated in FIGURE 9 upon rapid spinning of the shaft 44 and each end portion of the shaft 44 is grooved as at 88 and provided with a spring 90 seated in the corresponding groove 88 in a manner so as to be locked to the shaft 44 for rotation therewith. Each spring 90 includes a free end portion 92 selectively engageable in one of the corresponding small diameter apertures or bores 80. Each of the springs 90 tends to rotate the corresponding assembly 66 in a counterclockwise direction relative to the shaft 44 as seen in FIGURES 9–10 of the drawings and to also urge the end of the corresponding assembly 66 or 68 carrying its dog element 82 radially inwardly of the axis of rotation of the shaft 44.

The center portion of the shaft 44 is longitudinally slotted as at 94 and one end of the seat belt section 18 is secured in the slot 94 with the adjacent end portion of the seat belt section 18 at least partially wound about the shaft 94. The free end of the seat belt section 18 includes a seat belt end buckle element 96 and the end portion of the seat belt section 18 anchored to the shaft 84 has an elongated spring member 98 secured thereto in any convenient manner and which extends transversely of the section 18 and includes extended opposite end portions 100 which are engageable with the end edges of the corresponding assemblies 66 and 68 remote from the dog elements 82.

When the portion of the section 18 to which the spring member 98 is secured is wound on the shaft 44, the end portions 100 of the spring member 98 engage the assemblies 66 and 68 and urge the remote ends of the assemblies and the dog elements 82 outwardly against the tension of the springs 90 and away from the ratchet teeth 48. However, the assemblies 66 and 68 are eccentrically weighted with the dog element end portions thereof being the heaviest and therefore rapid spinning of the assemblies 66 and 68 with the shaft 44 will cause the dog elements 82 to be disposed radially outwardly of the ratchet wheels 46 and their teeth 48 even when the portion of the section 18 to which the spring member 98 is secured is unwound from the roll of the section 18 disposed on the shaft 44 when the shaft 44 is rotating above a minimum speed.

Although straight slots similar to the slots 70 could be utilized in the assemblies 66 and 68, the arcuate slots 70 serve to increase the reliability of the locking action of the retractor and also to provide for silent rewinding of the section 18 by the springs 56 as will hereinafter be more fully set forth.

In operation, and assuming that the seat belt section 18 is substantially fully wound on the shaft 44 as illustrated in FIGURE 1 of the drawings, the end portions 100 of the spring member 98 are engaged with the assemblies 66 and 68 and urge the latter, against the tension of the springs 90, toward positions similar to that illustrated in FIGURE 9 of the drawings with the dog elements 82 disposed radially outwardly of the outermost portions of the teeth 48. This, of course, will enable the free end portion of the seat belt section 18 to be grasped and pulled away from the seat belt retracting assembly 20 so as to unwind the section 18 from the shaft 44. As the portion of the seat belt section 18 to which the spring member 98 is secured is unwound from the roll on the shaft 44, the end portions 100 of the spring member 98 of course become ineffective to urge the assemblies 66 and 68 toward the positions illustrated in FIGURE 9 of the drawings against the spring tension of the springs 90 acting to yieldably urge the assemblies 66 and 68 toward the locked positions illustrated in FIGURE 8 of the drawings with the dog elements 82 fully seated in engagement with the teeth 48 of the wheel 46. However, rapid protraction of the seat belt section 18 causing a rapid rotation of the shaft 44 and the assemblies 66 and 68 as the portion of the seat belt 18 to which the spring member 98 is secured is unwound from the roll on the shaft 44 enables the centrifugal force of the heavier ends of the assemblies 66 and 68 to maintain the assemblies 66 and 68 in the positions illustrated in FIGURE 9 of the drawings with the dog elements 82 disposed radially outwardly of the teeth 48 against the tension of the springs 90. Thus, once rapid protraction of the seat belt section 18 has been initiated from a fully retracted position of the seat belt section 18, the seat belt section may be protracted past that point at which he spring member 98 would normally be rendered inactive to prevent the springs 90 from urging the assemblies 66 and 68 into locking engagement with the ratchet wheels 46.

However, as soon as rapid rotation of the shaft 44 during fast protraction of the belt section 18 is slowed or stopped, the centrifugal force acting upon the assemblies 66 and 68 diminishes to the point that the springs 90 will overcome the centrifugal force acting upon the assemblies 66 and 68 and urge the assemblies 66 and 68 from the positions illustrated in FIGURE 9 of the drawings toward the positions illustrated in FIGURE 8 of the drawings thereby moving the dog elements 82 into full seated engagement with the teeth 48. This full seated engagement of the dog elements 82 with the teeth 48 will of course prevent further rotation of the shaft 44 in a direction to protract the seat belt section 18. However, it will be apparent that the seat belt section 18 may be retracted at any time.

The arcuate slots 70 serve to insure that the ratchet dog elements 82 will be fully seated with the teeth 48 on the ratchet wheels 46 at any time rotation of the shaft 44 is stopped after the portion of the seat belt section 18 to which the spring member 98 is secured is unwound from the roll on the shaft 44 and also to enable the effective thrust directed upon the assemblies 66 and 68 by the springs 90 to urge the assemblies toward the positions in FIGURE 8 of the drawings to be reduced when the shaft 44 is rotating in a direction winding the seat belt section 18 thereon. Actually, the provision of the arcuate slots 70 in lieu of straight slots increases the effective thrust applied to the assemblies 66 and 68 by the springs 90 to urge the assemblies 66 and 68 to the positions illustrated in FIGURE 8 of the drawings against the centrifugal force effected by the assemblies 66 and 68 when they are spinning with the shaft 44 in a direction unwinding the section 18 therefrom as well as reduce the effective thrust applied to the assemblies 66 and 68 by the springs 90 when the shaft 44 is rotating in a direction to wind the section 18 thereon.

In actual practice it has been found that only one ratchet wheel and ratchet dog assembly is needed but the provision of two is contemplated as herein illustrated and described. Operation of the seat belt retractor assembly 20 has proven to be fully satisfactory when the assembly is provided with only one ratchet wheel and ratchet dog assembly but it is thought that it may be necessary to provide double locking mechanisms for the seat belt retractor assembly 20 to obtain full confidence therein.

The spring member 98 does not deactivate the locking mechanisms comprising the assemblies 66 and 68 and the ratchet wheel portions 46 in response to a given size roll of the section 18 on the winding member 44 but in response to a predetermined length of the base end of the section 18 being wound on the winding member 44 and can therefore be utilized to more precisely adjust the locking operation of the retractor assembly 20 even though different thickness belt sections may be used in conjunction therewith. Further, the slots 70, by being arcuate instead of straight insure that sudden retraction of the section 18 and immediate subsequent tension on the section 18, while the portion thereof on which the spring member 98 is secured is wound off the winding member 44, will not be effective to render the locking mechanisms inoperative to prevent further protraction of the section 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary locking seat belt retractor comprising a frame adapted to be anchored to a vehicle body, an elongated winding member journaled from said frame, a seat belt section having a first end portion wound on said winding member and a second free end portion, said frame including means defining a ratchet wheel at one end of said winding member disposed generally concentrically relative to the axis of rotation of said winding member and fixed against rotation with the latter, a ratchet dog assembly mounted for rotation with said winding member including an outer portion defining a dog element disposed radially outwardly of said ratchet wheel, and being mounted for limited shifting generally radially of the axis of rotation of said winding member between a first position with said dog element disposed radially outwardly of said wheel and a second position in full seated engagement with said wheel, said assembly being eccentrically weighted for movement to said first position by centrifugal force, first means operatively connected between said assembly and said winding member yieldingly urging said assembly toward said second position, and means carried by one portion of said second end portion and operatively engageable, with said assembly, upon said one portion being wound on said drum, to urge said assembly toward said first position against the force of said first means, and second means operatively connected between said winding member and said frame operative to urge rotation of said winding member in a direction winding said second portion of said belt section thereon.

2. The combination of claim 1 wherein said frame includes a pair of said ratchet wheels disposed adjacent opposite ends of said winding member and a ratchet dog assembly operatively associated with each of said ratchet wheels, said retractor also including one of said first means and one of said means operatively carried by said second end portion associated with each of said ratchet dog assemblies.

3. A seat belt retractor comprising a frame adapted to be anchored to a vehicle body, an elongated winding member journaled from said frame, a seat belt section having a first end portion wound on said winding member and a second free end portion, said frame including means defining a ratchet wheel at one end of said winding member disposed generally concentrically relative to the axis of rotation of said winding member and fixed against rotation with the latter, a ratchet dog assembly mounted for rotation with said winding member, and for limited shifting generally radially of the axis of rotation of said winding member between first and second limit positions, said ratchet dog assembly including a dog element disposed out of position for engagement with said ratchet wheel when in said first position and in full seated engagement with said wheel when in said second position, said assembly being eccentrically weighted for movement to said first position by centrifugal force, first means operatively connected between said assembly and said winding member yieldingly urging said assembly toward said second position, and means carried by one portion of said second end portion and operatively engageable, with said assembly, upon said one portion being wound on said drum, to urge said assembly toward said first position against the force of said first means, and second means operatively connected between said winding member and said frame operative to urge rotation of said winding member in a direction winding said second portion of said belt section thereon.

4. The combination of claim 3 wherein said frame includes a pair of said ratchet wheels disposed adjacent opposite ends of said winding member and a ratchet dog assembly operatively associated with each of said ratchet wheels, said retractor also including one of said first means and one of said means carried by said second end portion operatively associated with each of said ratchet dog assemblies.

5. An automatically locking seat belt assembly including a frame having means adapted to be anchored in a vehicle adjacent a passenger seat, a winding member rotatably supported from said frame, a retractable seat belt section having one end secured to said winding member for winding thereon, control means operatively associated with said frame and said winding member releasably preventing rotation of said winding member in a direction to unwind said retractable section, second means responsive to a given minimum quantity of said retractable section being wound on said winding member rendering said control means inoperative to prevent rotation of said winding member in said direction, and centrifugal weight means carried by said winding member for rotation therewith operative in response to a given minimum speed of rotation of said winding member in said direction during unwinding of the last of said minimum quantity of said section from said winding member to render said control means inoperative to prevent further rotation of said winding member in said direction to limit unwinding of said section past said minimum quantity until rotaton of said winding member in said other direction is slowed below said minimum speed.

6. The combination of claim 5 wherein said control means includes ratchet wheel means carried by said frame and mounted thereon against rotation with said winding member and a ratchet dog element carried by said winding member for rotation therewith and shiftable generally radially of the axis of rotation of said winding member into and out of engagement with said ratchet wheel.

7. The combination of claim 6 wherein said ratchet dog element is supported from a panel-like member having a slot formed therein, said winding member including a noncircular portion disposed generally concentrically with the axis of rotation of said winding member, said panel-like member being disposed on said noncircular portion with the latter snugly and slidably received in said slot.

8. The combination of claim 7 wherein said second means comprises an abutment member carried by one portion of said section and projecting outwardly of one side thereof and engageable with said panel-like member upon winding of said one portion of said section on said winding member.

9. The combination of claim 5 wherein said second means includes an element thereof carried by one portion of said section and engageable with a portion of said control means carried by said winding member for rotation therewith upon winding of said one portion of said section on said winding member.

10. The combination of claim 6 wherein said ratchet dog element is supported from a panel-like member having a slot formed therein, said winding member including a noncircular portion disposed generally concentrically with the axis of rotation of said winding member, said panel-like member being disposed on said noncircular portion with the latter snugly and slidably received in said slot, said slot being arcuate in configuration whereby oscillation of said panel-like member is effected upon shifting of said panel-like member generally radially of the axis of rotation of said winding member.

11. In combination, a rotary member, an elongated member connected to said rotary member for retraction and extension, a generally concentric noncircular shaft portion on said rotary member, a lock member mounted on said shaft portion for rotation therewith and having an elongated slot formed therethrough in which said shaft portion is disposed, said lock member being shiftable relative to said shaft portion by movement of the latter through said slot between a first active position operative to lock said rotary member against rotation in a direction to extend said elongated member and a second inactive position, means yieldingly urging said lock member to said active position, means responsive to a minimum quantity of said elongated member being wound on said rotary member operative to effectively oppose said yielding means and maintain said lock member in said inactive position during unwinding of said elongated member from said rotary member until less than said minimum quantity of said elongated member remains wound on said rotary member, and means responsive to rotation of said rotary member above a predetermined speed in a direction to unwind said elongated member therefrom also operative to effectively oppose said urging means and render the latter inoperative to shift said lock member to said active position as said rotary member is rotated in a direction to unwind said elongated member therefrom past a position with said minimum quantity of said elongated member wound on said rotary member until rotation of said rotary member is slowed below said minimum speed.

12. The combination of claim 11 wherein said slot is arcuate and said shaft portion includes opposite side surface portions generally paralleling and closely adjacent the edge portions of said lock member defining the opposite sides of said slot and the curvature of said arcuate slot is such that rotation of said rotary member in a direction to wind said elongated member thereon will effect a camming action between said opposite side surface portions of said shaft portion and the opposite sides of said slot to urge said lock member away from said operative position toward said inoperative position.

References Cited
UNITED STATES PATENTS

| | | | |
|---|---|---|---|
| 3,193,327 | 7/1965 | Roe | 297—388 |
| 3,286,946 | 11/1966 | Board et al. | 242—107.2 |
| 3,289,970 | 12/1966 | Board et al. | 242—107.4 |
| 3,294,445 | 12/1966 | Tino | 297—388 |

WILLIAM S. BURDEN, *Primary Examiner.*